United States Patent
Palgy et al.

(10) Patent No.: US 12,184,418 B2
(45) Date of Patent: Dec. 31, 2024

(54) SYSTEMS AND METHODS FOR EFFICIENT HARQ FOR NR USING LIMITED DDR THROUGHPUT INTERFACE

(71) Applicant: Sequans Communications SA, Colombes (FR)

(72) Inventors: Michal Palgy, Rosh Haayin (IL); Roy Ron, Tel Aviv (IL); Guy Reina, Givatayim (IL); Guillaume Vivier, Paris (FR)

(73) Assignee: Sequans Communications SA, Colombes (FR)

( * ) Notice: Subject to any disclaimer, the term of this patent is extended or adjusted under 35 U.S.C. 154(b) by 326 days.

(21) Appl. No.: 17/472,326

(22) Filed: Sep. 10, 2021

(65) Prior Publication Data

US 2023/0079699 A1 Mar. 16, 2023

(51) Int. Cl.
H04L 1/1812 (2023.01)
H04L 69/04 (2022.01)
H04W 28/06 (2009.01)

(52) U.S. Cl.
CPC ............ H04L 1/1812 (2013.01); H04L 69/04 (2013.01); H04W 28/06 (2013.01)

(58) Field of Classification Search
CPC ..... H04L 1/1812; H04L 69/04; H04L 1/1819; H04L 1/1835; H04L 1/1845; H04W 28/06; G06F 7/00
See application file for complete search history.

(56) References Cited

U.S. PATENT DOCUMENTS

| | | | | |
|---|---|---|---|---|
| 2009/0327836 | A1* | 12/2009 | Shimizu | H03M 13/3905 714/752 |
| 2014/0211775 | A1* | 7/2014 | Sampath | H04L 27/26136 370/338 |
| 2015/0109996 | A1* | 4/2015 | Lee | H04L 1/1845 370/328 |
| 2016/0241362 | A1* | 8/2016 | El-Khamy | H04L 1/1835 |
| 2018/0183549 | A1* | 6/2018 | Cho | H04L 43/16 |
| 2018/0254797 | A1* | 9/2018 | Amini | H04W 72/0446 |
| 2019/0098302 | A1* | 3/2019 | Alakuijala | H04N 19/172 |
| 2019/0238163 | A1* | 8/2019 | Talwar | H03M 7/3059 |

FOREIGN PATENT DOCUMENTS

WO WO-2021133390 A1 * 7/2021 ........... H04L 1/0045

* cited by examiner

*Primary Examiner* — Jackie Zuniga Abad
*Assistant Examiner* — Latresa A McCallum
(74) *Attorney, Agent, or Firm* — One LLP (57) ABSTRACT

Disclosed are example embodiments of systems and methods for hybrid automatic repeat request (HARQ). An example method includes performing a first HARQ compression to reduce a number of HARQ bits, the HARQ compression comprising one of a unified HARQ compression and a block-wise HARQ compression. Optionally, the example method further includes performing a second HARQ compression to further reduce the number of HARQ bits to a compressed number of HARQ bits. One of the first HARQ compression and the second HARQ compression include the unified HARQ compression and another of the first HARQ compression and the second HARQ compression comprising the block-wise HARQ compression. The example method also includes saving the compressed HARQ data to a DDR storage.

20 Claims, 7 Drawing Sheets

SYSTEMS AND METHODS FOR EFFICIENT HARQ FOR NR USING LIMITED DDR THROUGHPUT INTERFACE

TECHNICAL FIELD

The disclosure relates generally to the field of wireless communication, specifically and not by way of limitation, some embodiments are related to hybrid automatic repeat requests.

BACKGROUND

Hybrid automatic repeat request (HARQ) is a combination of high-rate forward error correction (FEC) and automatic repeat request (ARQ) error-control. In standard ARQ, redundant bits are added to data to be transmitted using an error-detecting (ED) code such as a cyclic redundancy check (CRC). Receivers detecting a corrupted message will request a new message from the sender. In Hybrid ARQ, the original data is encoded with an FEC code, and the parity bits are either immediately sent along with the message or only transmitted upon request when a receiver detects an erroneous message.

An HARQ mechanism in 3GPP-NR (5G) requires multiple read/write access to a double data rate (DDR) static random-access memory (SRAM) (DDR-SRAM) which stores the likelihood ratios (LLRs) of multiple code blocks (CBs). When a UE is configured with multiple component carriers (CCs) and targeting maximum throughput, it could happen that a burst of enormous access to the DDR is needed; for example, a fade in the channel across all CCs may activate multiple HARQ retransmissions which in turn load the DDR interface.

However, the DDR may have a limited interface (e.g., 16-bit interface) as this has an impact on the module cost. Therefore, it is important to efficiently use the available DDR interface with graceful performance degradation.

SUMMARY

Disclosed are systems and methods for performing HARQ compressions to reduce a number of HARQ bits.

One general aspect includes a method for hybrid automatic repeat request (HARQ). The method includes performing a HARQ compression to reduce a number of HARQ bits, the HARQ compression comprising one of a unified HARQ compression and a block-wise HARQ compression or both. The method includes saving the compressed HARQ data to a DDR storage.

One general aspect includes an apparatus for wireless communication. The apparatus includes a memory and at least one processor coupled to the memory. The processor is configured to perform a HARQ compression to reduce a number of HARQ bits, the HARQ compression comprising one of a unified HARQ compression and a block-wise HARQ compression or both. The processor is further configured to saving the compressed HARQ data to a DDR storage.

A non-transitory computer-readable medium storing computer executable code for wireless communication, the code when executed by a processor causing the processor to perform a HARQ compression to reduce a number of HARQ bits, the HARQ compression comprising one of a unified HARQ compression and a block-wise HARQ compression or both. The code when executed by a processor also causing the processor to save the compressed HARQ data to a DDR storage.

The features and advantages described in the specification are not all-inclusive. In particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the disclosed subject matter.

BRIEF DESCRIPTION OF THE DRAWINGS

The foregoing summary, as well as the following detailed description, is better understood when read in conjunction with the accompanying drawings. The accompanying drawings, which are incorporated herein and form part of the specification, illustrate a plurality of embodiments and, together with the description, further serve to explain the principles involved and to enable a person skilled in the relevant art(s) to make and use the disclosed technologies.

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

DETAILED DESCRIPTION

The detailed description set forth below in connection with the appended drawings is intended as a description of configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an, electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In NR, low density parity check (LDPC) code has been chosen as the coding scheme for the physical downlink shared channel (PDSCH), contrary to the Turbo code as in LTE. The PDSCH carries user data, broadcast system information not transmitted through the physical broadcast channel (PBCH) such as system information blocks (SIBs), and paging messages.

The performance of a common low density parity check (LDPC) decoder may be tightly linked to the scale of the input Log Likelihood Ratios (LLRs) to the decoder after the combining. A turbo decoder is much less sensitive to scaling. The performance of the LDPC decoder may be tightly linked to the scale of the input LLRs because, when using "min-sum algorithm" and applying the Jacobian-logarithm as a correction function in the "corrected min-sum algorithm"; the fact that the LDPC performs an accumulation of many "soft XOR" operations leads to some numerical issues which need to be taken care of carefully. Additionally, when using "sum-product algorithm" because of the inverse hyperbolic tangent function that asymptotically approaches infinity.

The power of the LLRs may be estimated and the scaling may be determined to target a desired root-mean-squared (RMS) at the input to the decoder to maximize the error correction performance. Moreover, the proposed unified HARQ compression targets the RMS at the HARQ output port according to the desired RMS at the input port. This means that the HARQ compression takes into account not only the pure RMS of the input LLRs but also estimates the RMS of the combined LLRs and scales them according to two constraints: (1) reaching desired RMS at the input to the decoder, and (2) targeting N bits at the HARQ output port that would allow IR-HARQ combining with following transmissions that would later comply again with the constraint of reaching desired RMS at the input to the decoder. Later, the proposed block-wise HARQ compression may reduce the required number of bits according to local power even more, as different areas in the circular HARQ buffer have a different number of accumulations.

An example compression scheme may be tightly coupled to a fragile "sweet point" that the low-density parity-check (LDPC) decoder is expecting at its input. In other words, an example compression scheme may be tightly coupled to a small range of expected digital inputs that the LDPC decoder is expecting at its input. No current systems deal with a fragile scaling of a combined likelihood ratio (LLR) from different transmissions at the LDPC decoder input and thus potentially may degrade decoding performance. Accordingly, systems and methods are proposed that may provide graceful performance degradation with 2-bits LLRs. An example embodiment may use 2-bits for high code rate and high modulation scheme.

To reduce the load on the DDR interface when writing the HARQ buffer for IR or reading the HARQ buffer for IR, especially at high throughput scenarios, the combined LLRs may be quantized to N-bits before sending the combined LLRs to the DDR. The quantization may use a smart compression scheme that may optimally choose the N-bits according to the estimated power of the combined LLRs. Graceful degradation may be achieved with only 2-bits LLR in some examples.

In an example embodiment, an objective may be to comply with a limited DDR interface. In the analysis described below, it may be assumed that a DDR interface of 16-bits is used for HARQ management at maximal throughput of about 7 Gbps where LLRs resolution before compression is of 8-bits per LLR. However, the systems and methods described herein may be employed on any other setup of limited interface DDR bit width and LLR bit width.

In some example embodiments, HARQ may use DDR. A relevant range in a HARQ buffer of previous redundancy versions (RV) (e.g., from previous transmissions) may be fetched from the DDR for soft combining. Soft combining may assume that, even if a data packet was erroneously decoded, the data may still contain information. Accordingly, the erroneously decoded data packet may be stored in a buffer memory and later combined with the retransmitted data to obtain a single, combined packet that is more reliable than its constituent parts. After the combining, only the relevant part in the HARQ buffer that is changed according to the current RV is written back to the DDR. To minimize HARQ usage on DDR, LLRs of successful decoded code blocks might not be stored. The storage size may be further decreased by saturating the LLR to N-bits (e.g., where N<8) in scenarios with relatively high throughputs (less retransmissions).

For that purpose, the Target de-coder (TC) LDPC core may be configured under the constraint of post saturating the combined LLRs to N-bits (e.g., after getting HARQ Combining (HC) output from TC). A smart compression scheme that optimally chooses those N-bits according to the estimated power of the combined LLRs consists of targeting the combined LLRs RMS at the TC HARQ output port according to N and then saturating the LLR to N-bits before sending them to the DDR.

Figure 1:
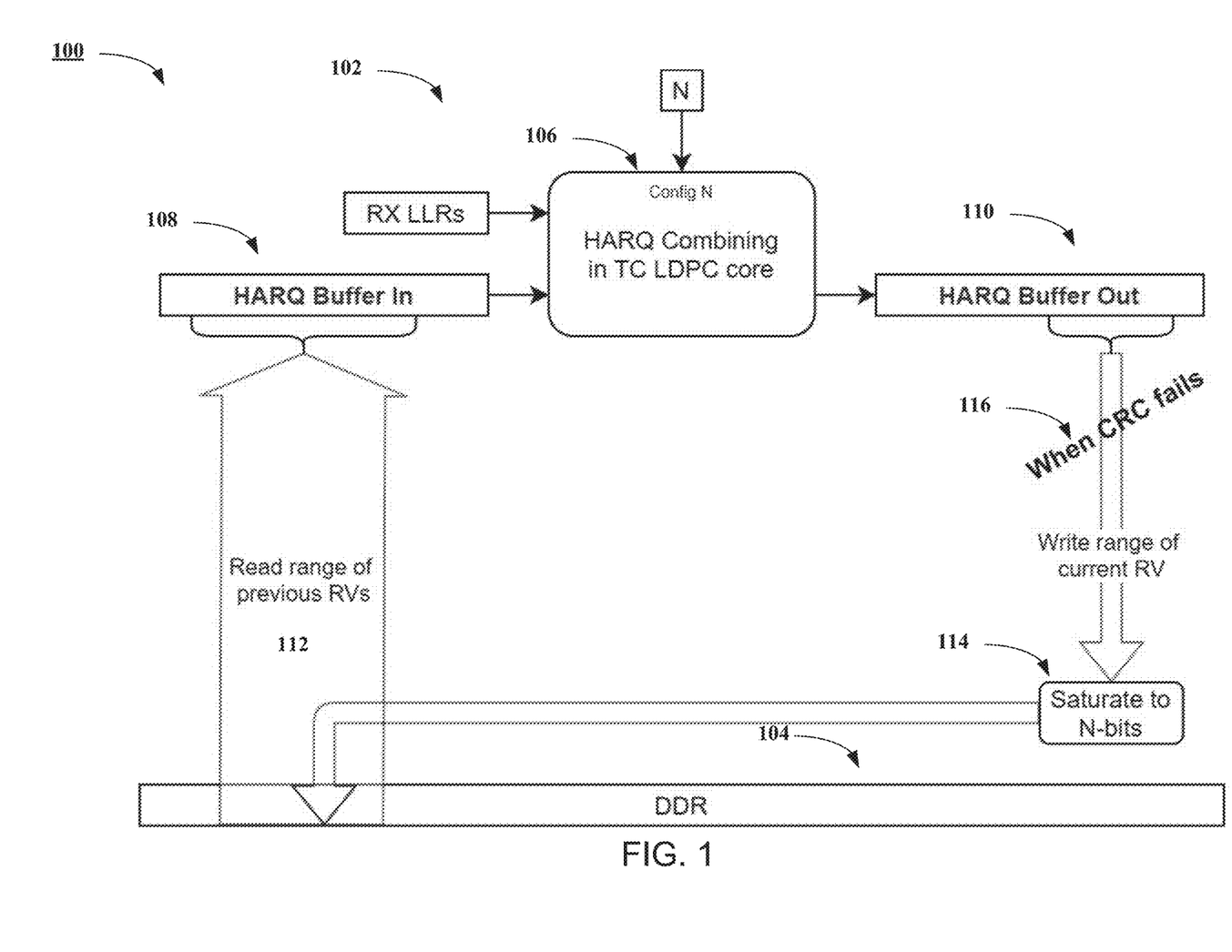
FIG. 1 is a diagram that illustrating HARQ usage of DDR and unified HARQ compression.

FIG. 1 is a diagram 100 that illustrates HARQ 102 usage of DDR 104. The HARQ 102 may include a HARQ input buffer 108, a TC LDPC core 106, and a HARQ output buffer 110. The HARQ input buffer 108 may receive a read range of previous RVs 112 from the DDR 104. When a cyclic redundancy check (CRC) fails, a range of a current RV 116 especially at high throughput scenarios, the combined LLRs may be quantized to N-bits before sending them to the DDR. The BW estimation in worst case equals:

$$BW_{HARQ,WC} = 7 \text{ Gbps} * N\text{-bits}/LLR * 3 \text{ (300\% retransmissions)}$$

The effect of LLR depth on error correction performance may be evaluated and summarized in Table 1 1. Graceful degradation is achieved with merely 2-bits LLR. In worst case, 2-bit LLR compression introduces 2.7 dB performance degradation, and on average 1.3 dB. However, for the high throughput range the performance degradation is much smaller: 0.7 dB in worst case and 0.1 dB in average.

TABLE 1

N-bits combined LLR performance degradation (relative to 8-bits) in worst and average cases over all tested channels, with RV order of {0, 2, 3, 1}.

| | | SNR degradation [dB] @ norm Throughput range | | | | | | | |
|---|---|---|---|---|---|---|---|---|---|
| | $BW_{HARQ,WC}$ | in worst case | | | | in average case | | | |
| N | [Gbps] | [0, 1/4] | [1/4, 1/3] | [1/3, 1/2] | [1/2, 1] | [0, 1/4] | [1/4, 1/3] | [1/3, 1/2] | [1/2, 1] |
| 8 | 168 | — | — | — | — | — | — | — | — |
| 4 | 84 | 0.9 | 0.6 | 1.0 | 0.2 | 0.2 | 0.1 | 0.1 | 0.0 |
| 2 | 42 | 2.7 | 2.5 | 2.2 | 0.7 | 1.3 | 1.1 | 0.8 | 0.1 | may be written to the DDR 104 through a saturate to N-bits block 114. The saturate to N-bits block 114 saturates the range of the current RV to N-bits.

Operational optimizations are depicted in FIG. 1. A HARQ buffer 110 may include data that is compressed. The compression may be achieved by using a TC LDPC core 106 with a smart configuration that targets the combined LLRs RMS at the TC HARQ output port 110 according to N and then saturating the LLR to N-bits before sending them to the DDR. Alternatively, an embodiment may choose to compress the HARQ buffer outside the TC LDPC core as described herein.

In an example a DDR Interface may make bandwidth (BW) estimates, e.g., to prove an analysis. A rough assessment of the required DDR bandwidth may be an average case: maximal throughput of 7 Gbps @ BLER of 10% for 1st TX, a worst case: maximal throughput of 7 Gbps @ BLER of 100% for the first to third transmissions (TXs). In one example embodiment, the LLRs resolution may be 8 bits per LLR. A BW estimate may be: $BW_{DDR}$ @ 2 GHz→~3 Gbps per pin→48 Gbps for a 16 bits DDR.

As discussed above, DDR means double data rate. A DDR memory may be able to transfer two bits per cycle per pin in theoretically. Accordingly, with a memory at 2 GHz, in theory, a system could get 4 Gbits/s per pin. However, considering the overhead and any kind of practical issues that prevent getting the maximum theoretical throughput, 75% efficiency is typical value, so 3 Gbps (75%*4 Gbits/s) may be a good estimation.

For a read+write 1 RV:

$$BW_{HARQ,AVG} = 2 * 7 \text{ Gbps} * 8\text{-bits}/LLR * 0.1 \text{ (10\% retransmissions)} = 11.2 \text{ Gbps}$$

For a read 3 RVs:

$$BW_{HARQ,WC} = 7 \text{ Gbps} * 8\text{-bits}/LLR * 3 \text{ (300\% retransmissions)} = 168 \text{ Gbps}$$

Figure 2:
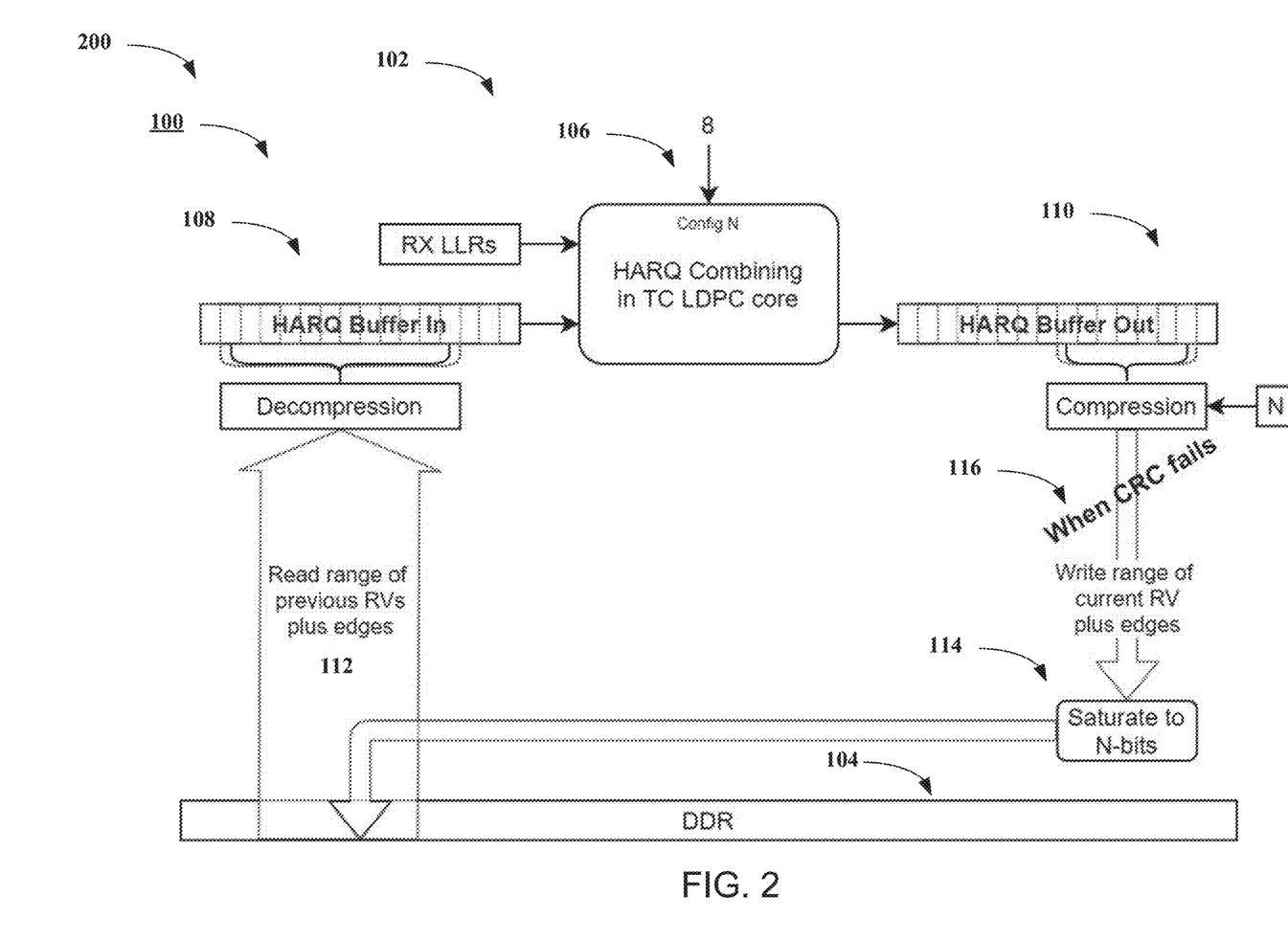
FIG. 2 is a diagram that illustrating block-wise HARQ compression.

To reduce the load on the DDR interface when writing, reading, or writing and reading the HARQ buffer for IR, FIG. 2 is a diagram that illustrating block-wise compression 200. Unified HARQ buffer compression (FIG. 1) may be achieved by using TC LDPC core with a smart configuration that targets the combined LLRs RMS at the TC HARQ output port according to N and then saturating the LLR to N-bits before sending them to the DDR. However, there is an option to further decrease the performance degradation with block-wise compression 202 after getting the combined LLRs from the TC core, and block-wise decompression 204 before sending the combined LLRs to the TC core (FIG. 2).

In an example embodiment, external compression does not delay the CB decoding process.

In an example embodiment, additional hardware may be required for block-wise HARQ compression, including a HARQ buffer that may be partitioned into blocks. For compression, relevant blocks may be sent to the DDR (e.g., overlap with the current RV). The RMS of combined LLRs may be measured and each of the blocks may be scaled separately to target the effective range for the N-bits. For decompression, when the combined LLRs are fetched from the DDR, inverse scaling may be applied per block. The scaling per block may be saved to DDR in addition to the combined LLRs, however for the proposed block size of 64 and 3-bits for the scale the BW increase is negligible. Also, the BW increase due to full blocks at the edges that are read/written to/from the DDR may be negligible (such an address alignment might be needed anyway for the DMA even without block-wise compression).

The number of right shifts in the compression (and left shifts in the decompression) may be calculated according to the measured block RMS, where each of the blocks is of size blockSize=64 (the method can be employed on any other block size).

The block RMS is calculated according to:

$$blockRMS = \sqrt{\frac{\sum_{k=0}^{blockSize-1}|combinedLLR_k|^2}{blockSize}}$$

The target block RMS is pre-calculated for N=2,4,6:

$$targetBlockRms = 0.5*(2^{targetN-1}-1)$$

$$targetN = \max(N,3)$$

For less than 3-bits the target RMS may be according to 3-bits to avoid erasure of relevant combined LLRs.

The number of shifts is set to target the block RMS:

$$blockShift = \min\left\{\max\left\{\log_2\frac{blockRms}{targetBlockRms}, 0\right\}, maxShift\right\}$$

where $maxShift = 8 - N$.

The effect of LLR depth on error correction performance with unified versus block-wise compression is summarized in Table 2.

In the worst case, a 2-bit LLR block-wise compression introduces 1.7 dB performance degradation, whereas with unified compression on average introduces up to 2.7 dB performance degradation.

TABLE 2

N-bits combined LLR performance degradation (relative to 8-bits) for unified and block-wise compression in worst case over all tested channels, with RV order of {0, 2, 3, 1}.

| N | $BW_{HARQ,WC}$ [Gbps] | Compression | SNR degradation [dB] @ norm Throughput range | | | |
|---|---|---|---|---|---|---|
| | | | [0, 1/4] | [1/4, 1/3] | [1/3, 1/2] | [1/2, 1] |
| 8 | 168 | None | — | — | — | — |
| 4 | 84 | Unified | 0.9 | 0.6 | 1.0 | 0.2 |
| | | Block-Wise | 0.5 | 0.4 | 0.4 | 0.2 |
| 2 | 42 | Unified | 2.7 | 2.5 | 2.2 | 0.7 |
| | | Block-Wise | 1.5 | 1.7 | 1.5 | 0.7 |

Figure 3:
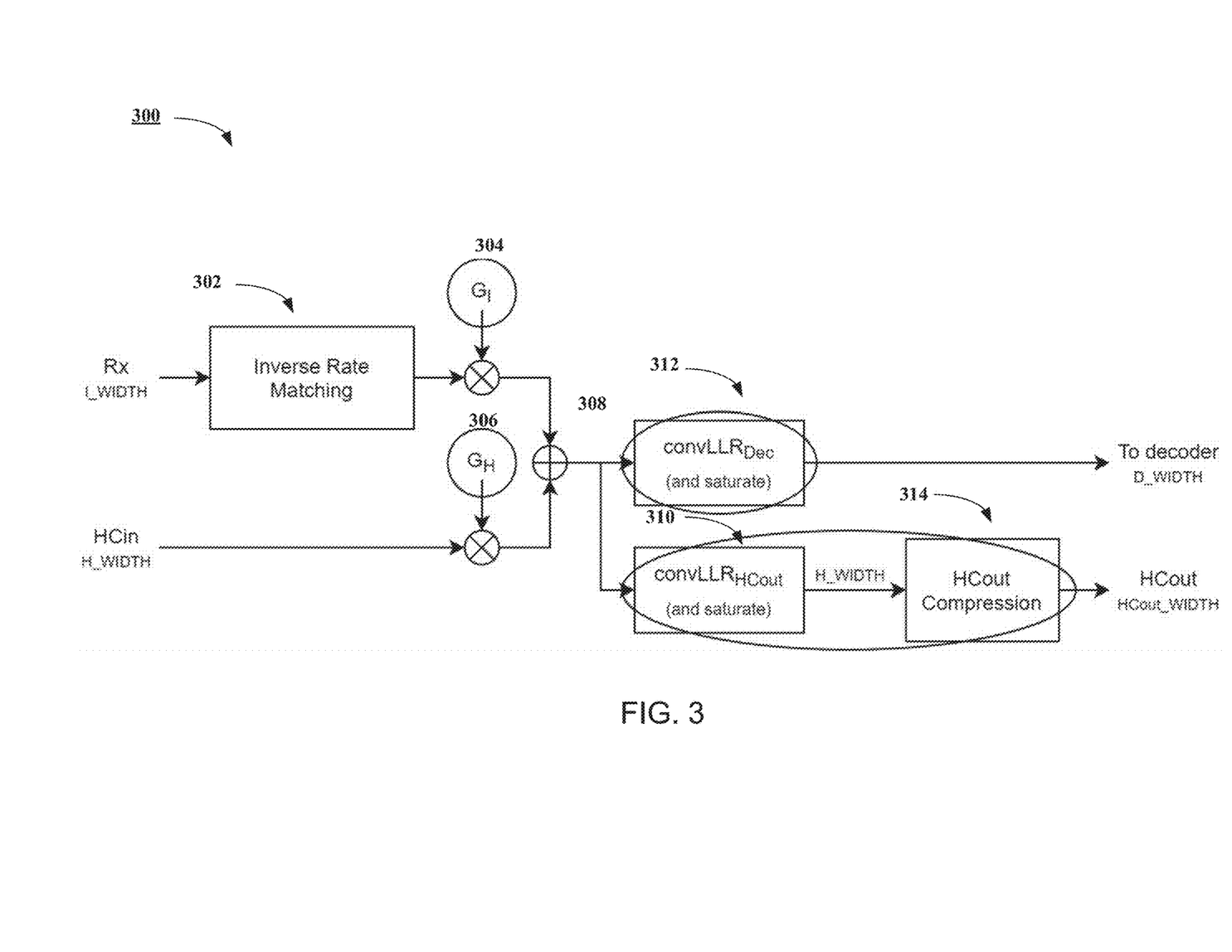
FIG. 3 is a diagram illustrating a Target de-Coder (TC) configuration and an inverse rate matching and HARQ combining.

FIG. 3 is a diagram 300 illustrating a TC configuration and an inverse rate matching 302 and HARQ combining. An example TC LDPC core configuration may include four parameters that may be optimized and give the configuration: $G_I$ is a scaling factor applied on Rx samples 304. $G_H$ is a scaling factor applied on HCin samples 306. The convLLR$_{Dec}$ 312 for right-shift (e.g., division by a power of 2) the combined LLRs 308. The convLLR$_{Dec}$ for right-shift may be before sending them to the LDPC decoder. The convLLR$_{HCout}$ 310 (+HCoutCompression) 314 is for right-shift (e.g., division by a power of 2) and the combined LLRs before sending them to the HARQ output port. The latter 314 may be used only when combined LLRs are saturated to six bits and below and gives up to two additional right shifts, however, an example method may be employed to any other number of shifts. The four parameters are optimized for combinations of modulation scheme (QPSK, 16QAM, 64QAM, 256QAM) and code rate (from 0.03 to 0.92) and limited to MCS according to 3GPP TS 38.214 Tables 5.1.3.1-1 to 3. The diagram 300 illustrates an inverse rate matching 302 that receives RX LLRs of I-width.

TABLE 3

Code Rate range per Modulation scheme [3GPP TS 38.214 Tables 5.1.3.1-1 to 3].

| Modulation | Min CR | Max CR |
|---|---|---|
| QPSK | 0.0293 | 0.6631 |
| 16 QAM | 0.3320 | 0.6426 |
| 64 QAM | 0.4277 | 0.9258 |
| 256 QAM | 0.6665 | 0.9258 |

The selected configuration gives maximal normalized throughput with 4 maximum number of HARQ transmissions and RV order of {0,2,3,1} (RV order as defined in 3GPP TS 38.101-4, RAN4).

The configuration targets a desired (empirically found) RMS of the combined LLRs after all the gains (GI and GH) and right-shifters (convLLR$_{Dec}$ and convLLR$_{HCout}$+HCoutCompression) at the input to the decoder and at the HARQ output port.

The target RMS at the input to the decoder is calculated according to:

$$targetDecRms = sclDecRms*(2^{D\_WIDTH-1}-1)$$

$$sclDecRms = \sqrt{numLayers}*sclDecRmsSingleLayer$$

where numLayers is the number of layers, and sclDecRmsSingleLayer is given in Table 4 Table 4.

TABLE 4 sclDecRmsSingleLayer according to MCS.

| | Code Rate | sclDecRmsSingleLayer |
|---|---|---|
| QPSK | 0.03 | 0.03 |
| | 0.1 | 0.03 |
| | 0.2 | 0.04 |
| | 1/3 | 0.04 |
| | 0.42 | 0.05 |
| | 1/2 | 0.06 |
| | 2/3 | 0.07 |
| 16 QAM | 1/3 | 0.05 |
| | 0.42 | 0.06 |
| | 1/2 | 0.06 |
| | 2/3 | 0.07 |
| 64 QAM | 0.42 | 0.07 |
| | 1/2 | 0.08 |
| | 2/3 | 0.08 |
| | 3/4 | 0.09 |
| | 5/6 | 0.11 |
| | 0.92 | 0.11 |
| 256 QAM | 2/3 | 0.09 |
| | 3/4 | 0.11 |
| | 5/6 | 0.14 |
| | 0.92 | 0.15 |

The target RMS at the HARQ output port is calculated according to:

targetHCoutRms=sclOutRms*($2^{targetN-1}-1$)

where sclOutRms=10*sclDecRms and targetN=max(N,3) and N≤H_WIDTH.

As aforementioned, the combined LLRs are saved to the DDR HARQ buffer with N-bits representation; sclOutRms and targetN are part of a smart compression scheme that optimally chooses those N-bits according to the estimated power of the combined LLRs. Note that for less than 3-bits the target RMS is according to 3-bits to avoid erasure of relevant combined LLRs. To estimate the RMS of combined LLRs at the input to the decoder and at the HARQ output port, we measure the RMS of Rx-LLRs and estimate the effective number of accumulations in the circular HARQ buffer.

The RMS of Rx-LLRs is calculated according to:

$$rxLLRsRMS = \sqrt{\frac{\sum_{k=0}^{K-1}|RxLLR_k|^2}{K}}$$

where only K Rx-LLRs may be measured, and K=256 as an example.

The effective number of accumulations in the circular HARQ buffer is estimated per code rate and per HARQ transmission index and assumes RV order of {0,2,3,1} and up to 4 HARQ transmissions (RV order as defined in 3GPP TS 38.101-4, RAN4) and is given below in Table 5. In one example embodiment, the proposal does not make an assumption for the RV order or the maximal number of HARQ transmissions. However, in an example, choose this order for evaluation since this is the most common one in practice.

TABLE 5 effNumAccInCircularHarqBuffer according to code rate and HARQ transmission index.

| Code Rate | 1st TX | 2nd TX | 3rd TX | 4th TX |
|---|---|---|---|---|
| 0.03 | 2.6 | 3.9 | 5 | 6.1 |
| 0.1 | 1.4 | 2.1 | 2.7 | 3.2 |
| 0.2 | 1 | 1.5 | 1.9 | 2.3 |
| 1/3 | 1 | 1.1 | 1.4 | 1.6 |
| 0.42 | 1 | 1 | 1.3 | 1.5 |
| 1/2 | 1 | 1 | 1.2 | 1.4 |
| 2/3 | 1 | 1 | 1.1 | 1.2 |
| 3/4 | 1 | 1 | 1.2 | 1.4 |
| 5/6 | 1 | 1 | 1.2 | 1.3 |
| 0.92 | 1 | 1 | 1.2 | 1.2 |

The approximated RMS of combined LLRs is thus equal to:

approxCombLLRsRms=rxLLRsRms*effNumAccInCircularHarqBuffer

For calculating $G_I$, the value of $G_I$ is bounded to the range of [1, $2^{G\_WIDTH}-1$], and additionally upper limited by the maximum of convLLR$_{HCout}$ (+HCoutCompression) to avoid over-gaining that would not allow reaching the RMS target at the HARQ output port.

$$maxGI = \min\left\{2^{maxShiftHCout} * \frac{targetHCoutRms}{approxCombLLRsRms}, 2^{G\_WIDTH}-1\right\}$$

Where maxShiftHCout equals the maximum number of shifts available by convLLR$_{HCout}$ (+HCoutCompression). For example:

maxShiftHCout=(N>6)?4:6

$G_I$ may be determined to target convLLR$_{Dec}$ close to 0:

$$targetGI = \frac{targetDecRms}{approxCombLLRsRms}$$

Finally,

GI=max{min{targetGI,maxGI},1}

For calculating convLLR$_{Dec}$, the value of convLLR$_{Dec}$ may be bounded to the range of [0,4](an example method may be employed on any other range) and set to target the RMS at the input to the decoder.

$$targetConvLlrDec = \text{round}\left(\log_2 \frac{GI * approxCombLLRsRms}{targetDecRms}\right)$$

convLlrDec = min{max(targetConvLlrDec, 0}, 4}

For calculating convLLR$_{HCout}$ (+HCoutCompression), the overall number of shifters are set to target the RMS at the HARQ output port.

$$targetConvLlrHCout = \text{round}\left(\log_2 \frac{GI * approxCombLLRsRms}{targetHCoutRms}\right)$$

convLlrHCoutExtended =
min{max{targetConvLlrHCout, 0}, maxShiftHCout}

The number of right shifts using convLLR$_{HCout}$ may be bounded to the range of [0,4] (the method can be employed on any other range):

convLlrHCout=min{convLlrHCoutExtended,4}

Resulting in the number of right shifts using HCoutCompression:

HCoutCompAddSR=max{convLlrHCoutExtended−convLlrHCout,0}

When HCoutCompAddSR=0 than HCout compression mode is set to 0 (bypass compression). When HCoutCompAddSR=1 than HCout compression mode is set to 2 (right shift 1 bit). When HCoutCompAddSR=2 than HCout compression mode is set to 3 (right shift 2 bits). In an example embodiment, the method may be employed on any other configuration of HCoutCompAddSR.

For calculating $G_H$, for a proper HARQ combining the combined LLRs from previous transmissions are scaled according to current GI, previous GI and previous convLLR$_{HCout}$ (+HCoutCompression).

$$targetGH = \frac{GI}{prevGI} * 2^{prevConvLlrHCoutExtended}$$

GH = max{min{targetGH, $2^{G\_WIDTH}-1$}, 1}

The RV range of previous transmission may be properly combined with the new RX LLRs, however it is not assured that the other previous transmissions are properly combined since a single GH multiplies the entire HARQ buffer. For the first HARQ transmission the GH may not be used because the HARQ buffer is all zeros; In this case we may choose to set prevGI=1 and prevConvLlrHCoutExtended=0 and thus get GH=GI.

Simulation parameters for NR-PDSCH are summarized in Table 6. N-bits combined LLR performance degradation (relative to 8-bits) in worst case over all tested channels is given in Table 2. In worst case, 2-bit LLR block-wise compression introduces 1.7 dB performance degradation, whereas with unified compression on average up to 2.7 dB. Some figures are shown below for illustration: Normalized throughput for TC LDPC decoder with N-bits combined LLR in DDR and a floating-point reference LDPC decoder as benchmark (notated as SEQUANS in the legend).

TABLE 6

Simulation parameters.

| Parameter | Value |
|---|---|
| Number of CBs per TB | 1 |
| TBS | Single layer: 2700 to 3700 bits depending on the code rate. |
| | Multi layers: 2700 to 5000 bits depending on the code rate. |
| MCS | Cover The diagram 300 illustrates an inverse rate matching 302 that receives RX LLRs of I-width. |
| | Table 3: |
| | All modulation orders {2,4,6,8}. |
| | Code rates from 0.03 to 0.92 |
| Number of layers | 1,2,4 |
| Maximum number of HARQ transmissions | 4 |
| RV order | {0,2,3,1} |
| | Except when evaluating a competitive order of {0,3,2,1}. |
| More HARQ params | 8 HARQ processes, fixed PDSCH to HARQ timing of k1 = 4 and fixed HARQ to PDSCH timing of k2 = 4. |
| LDPC decoder maximum number of iterations | 12 |
| Rx LLRs | 8-bits; |
| | Note: For above 2 layers we added floating point SSD equalization as benchmark (together with floating point reference decoder). |
| Combined LLRs in DDR | N-bits; where N = 8,4,2. |
| | Quantized to a non-symmetric range [−2(N-1), −1 + 2 (N-1)]. |
| Channel | 1 × 1 AWGN |
| | 1 × 4 ETU with Doppler of 30 Hz |
| | 1 × 4 ETU with Doppler of 70 Hz |
| | 2 × 2 EPA with Doppler of 3 Hz |
| | 2 × 2 EPA with Doppler of 10 Hz |
| | 4 × 4 EPA with Doppler of 3 Hz |
| | 4 × 4 EPA with Doppler of 10 Hz |

Figure 4:
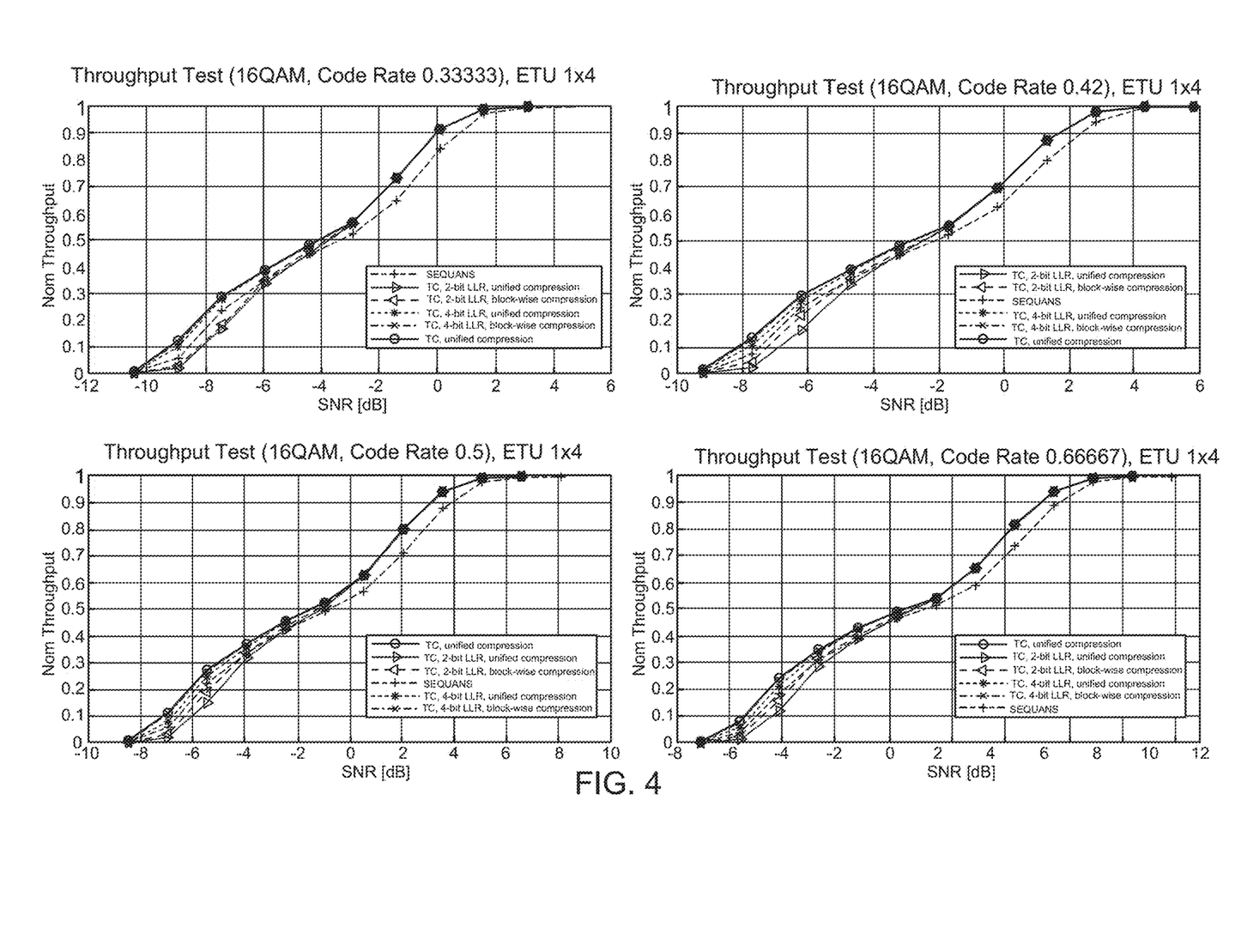
FIG. 4 is a diagram illustrating charts of LDPC throughput, 1×4 ETU (Doppler 70 Hz) channel.

FIG. 4 is a diagram 400 illustrating charts of LDPC throughput, 1×4 ETU (Doppler 70 Hz) channel.

Figure 5:
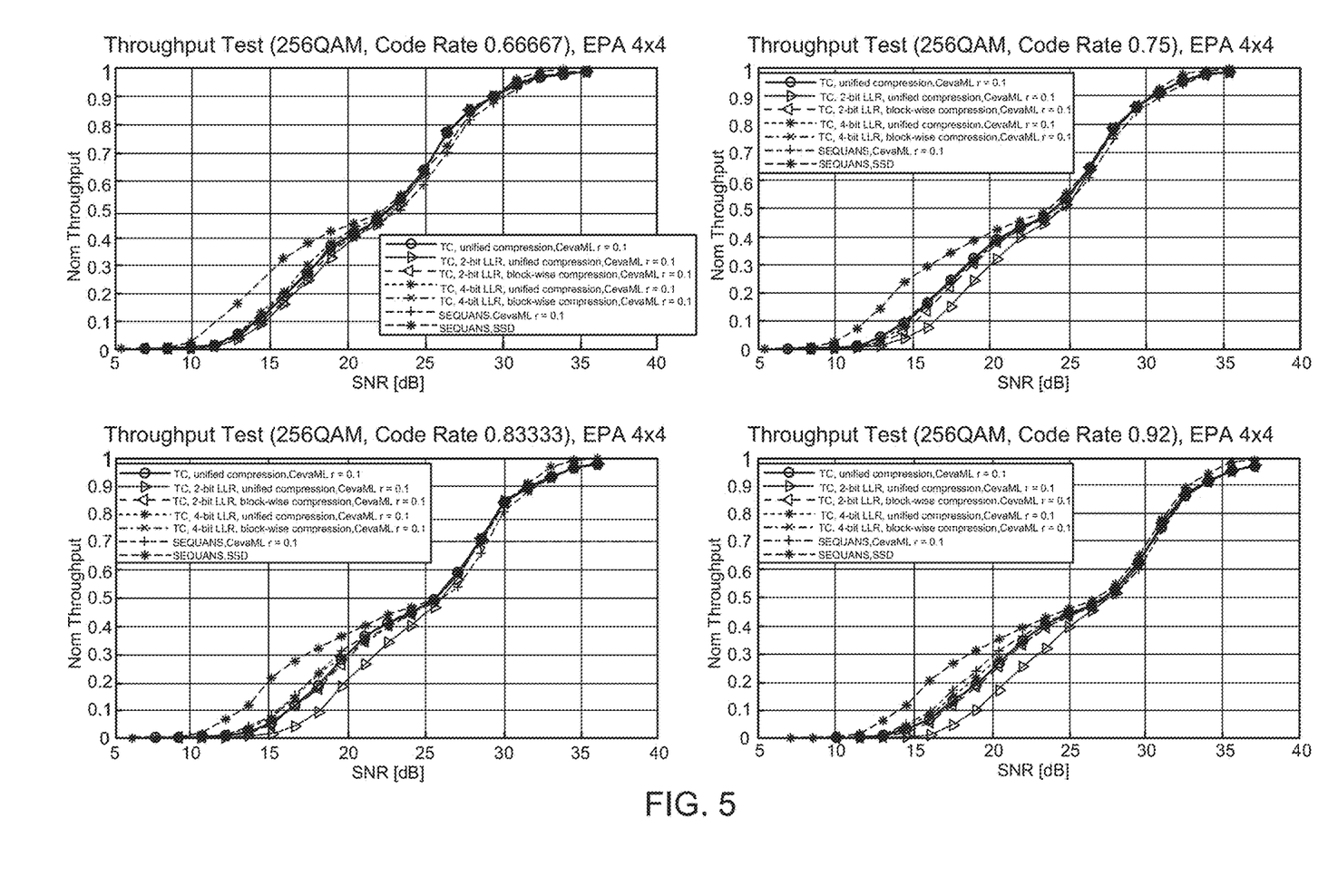
FIG. 5 is a diagram illustrating charts of LDPC throughput, 4×4 EPA (Doppler 10 Hz) channel.

FIG. 5 is a diagram 500 illustrating charts of LDPC throughput, 4×4 EPA (Doppler 10 Hz) channel.

Figure 6:
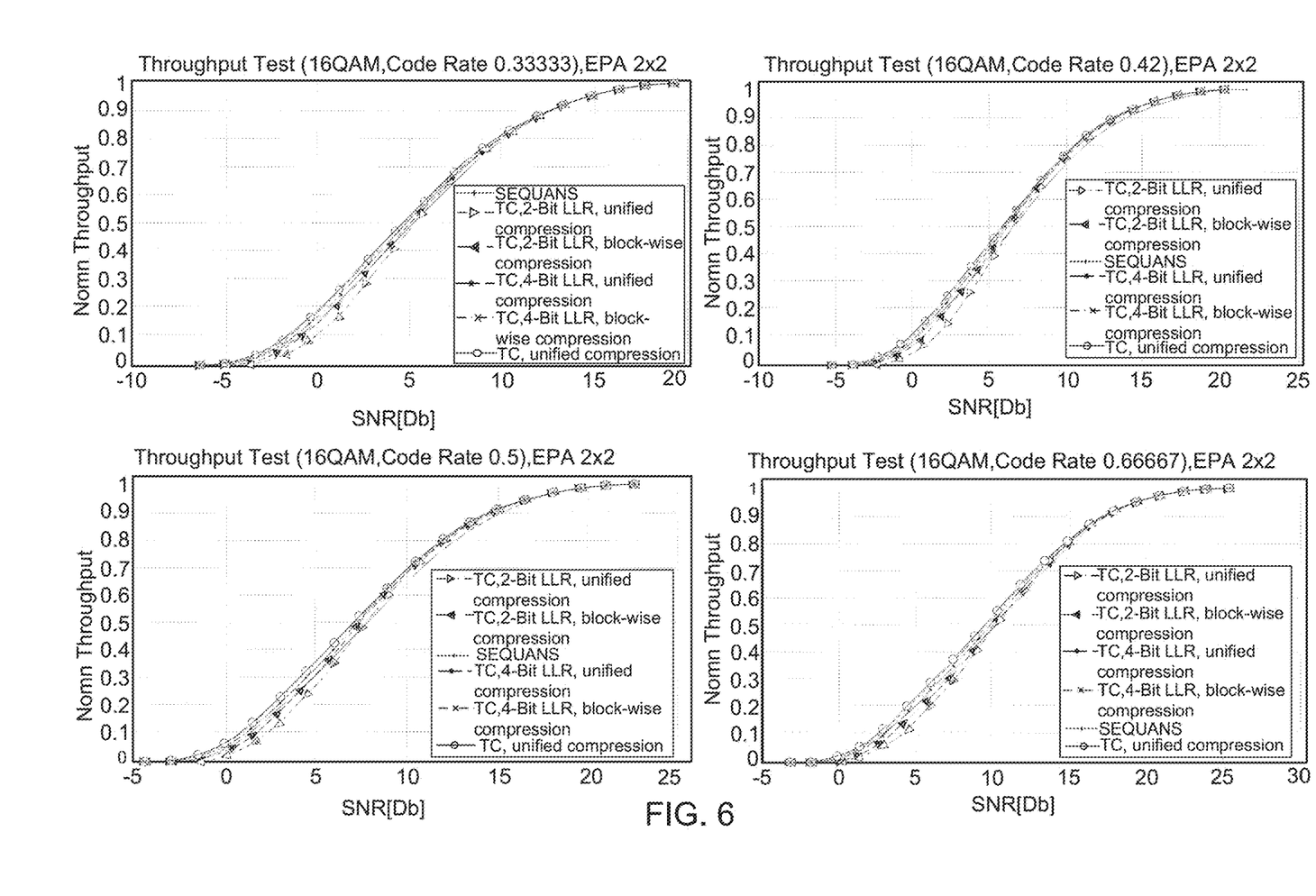
FIG. 6 is a diagram illustrating charts of LDPC throughput with a competitive RV order of {0,3,2,1}, 2×2 EPA (Doppler 10 Hz) channel.

FIG. 6 is a diagram 600 illustrating charts of LDPC throughput with a competitive RV order of {0,3,2,1}, 2×2 EPA (Doppler 10 Hz) channel.

In an example embodiment, the combined HARQ LLRs of LDPC code may be compressed in one or two stages. The first stage may be a unified HARQ compression in which the power of the received LLRs may be estimated and the scales from the received LLRs and the previous combined HARQ LLRs towards the decoder and towards the HARQ output ports may be determined according to two constraints. The first constraint is reaching a desired RMS at the input to the decoder to maximize the error correction performance. The second constraint is targeting N bits at the HARQ output port that would allow IR-HARQ combining with following transmissions that would later comply again with the constraint of reaching desired RMS at the input to the decoder.

In an example embodiment, the first stage may include estimating the RMS of the LLRs after the combining according to the effective number of accumulations in a circular HARQ buffer per code rate and per HARQ transmission index (without actually measuring the combined LLRs). Moreover, the desired RMS at the HARQ output port may be tightly coupled to the desired RMS at the input of the decoder especially when targeting only 2 bits per LLR.

In an example embodiment, four parameters may be optimized and give the compression configuration: scaling factor applied on received LLRs, scaling factor applied on previous combined HARQ LLRs, number of right-shift (e.g., division by a power of 2) the combined LLRs before sending them to the LDPC decoder and number of right-shift (e.g., division by a power of 2) the combined LLRs before sending them to the HARQ output port.

The second stage may include a block-wise HARQ compression to reduce even more the required number of bits according to local power, as different areas in the circular HARQ buffer have different number of accumulations.

In an example embodiment, a HARQ buffer may be partitioned into blocks, and the relevant blocks that are sent to the DDR (e.g., overlap with the current RV), the RMS of combined LLRs is measured and each of the blocks are scaled separately to target the effective range for the N-bits.

In one example embodiment, using the proposed compression scheme, the UE may be capable of fast recovery to the UEs maximum throughput of 7 Gbps using only 16-bit DDR interface when extreme number of HARQ transmissions are required sporadically due to a temporary fade in the channel, as opposed to the brute force and more expensive solution of using 32-bit DDR interface. An example embodiment may also exploit a maximum from "scaling" capabilities available in a common NR LDPC decoder.

Figure 7:
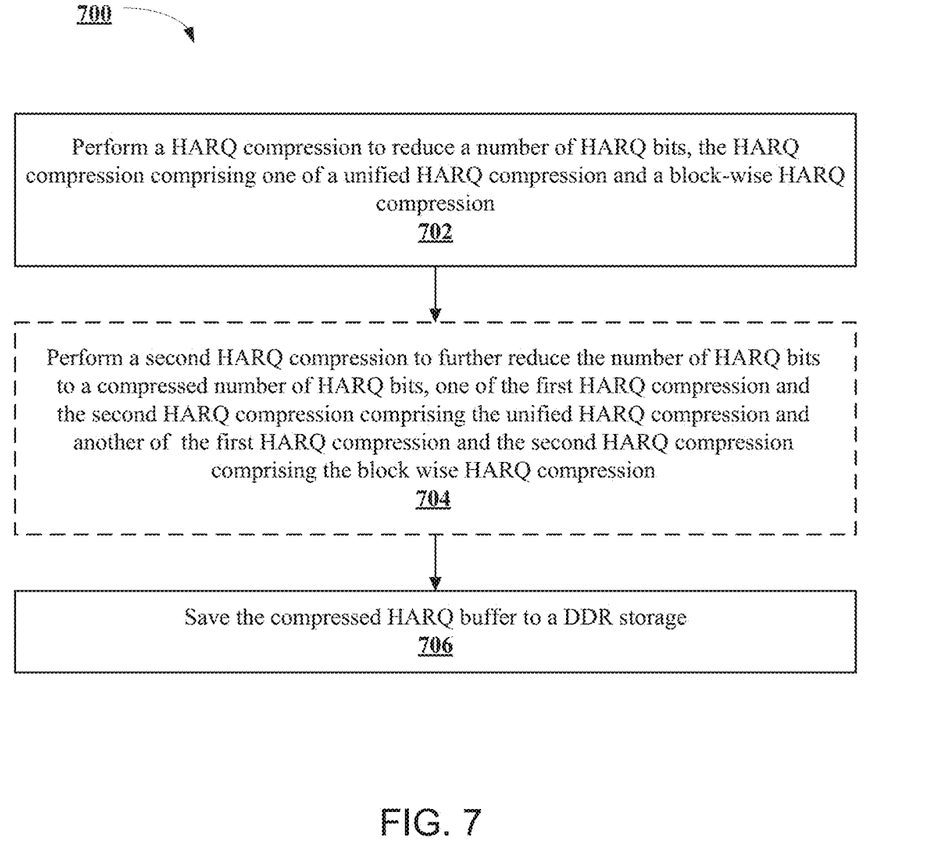
FIG. 7 is a flow diagram illustrating an example method in accordance with the systems and methods described herein.

FIG. 7 is a flow diagram 700 illustrating an example method in accordance with the systems and methods described herein. The method 700 is a method for HARQ including performing a first HARQ compression to reduce a number of HARQ bits, the HARQ compression comprising one of a unified HARQ compression and a block-wise HARQ compression (702). Optionally, the method 700 further includes performing a second HARQ compression to further reduce the number of HARQ bits to a compressed number of HARQ bits, one of the first HARQ compression and the second HARQ compression comprising the unified HARQ compression and another of the first HARQ compression and the second HARQ compression comprising the block-wise HARQ compression (704). The method 700 also includes saving the compressed HARQ buffer to a DDR storage (706).

In an example embodiment, when there are two compressions (e.g., a first compression and a second compression) then the first compression may always be a unified HARQ compression. In an example embodiment, when there is only one compression, then the compression may be either a unified compression or a block wise HARQ compression. Other example embodiments may have other compression schemes.

One or more of the components, steps, features, and/or functions illustrated in the figures may be rearranged and/or combined into a single component, block, feature or function or embodied in several components, steps, or functions. Additional elements, components, steps, and/or functions may also be added without departing from the disclosure. The apparatus, devices, and/or components illustrated in the Figures may be configured to perform one or more of the methods, features, or steps described in the Figures. The algorithms described herein may also be efficiently implemented in software and/or embedded in hardware.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the methods used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared or otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following disclosure, it is appreciated that throughout the disclosure terms such as "processing," "computing," "calculating," "determining," "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. It will be appreciated that a variety of programming languages may be used to implement the teachings of the invention as described herein.

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats.

Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming.

Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for hybrid automatic repeat request (HARQ), comprising:
    performing a first HARQ compression to reduce a number of HARQ bits, the HARQ compression comprising a block-wise HARQ compression; and
    saving the compressed HARQ bits to a double data rate (DDR) storage,
    wherein the HARQ compression includes an estimate of a power of a received likelihood ratio (LLR).

2. The method of claim 1, wherein the HARQ compression scales from the received LLR and a previous combined HARQ LLR towards a decoder and towards an HARQ output port are determined according to two constraints.

3. The method of claim 2, wherein to the two constraints include:
    constraint (1):
        reaching a desired root-mean-squared (RMS) at an input to the decoder to maximize an error correction performance, and
    constraint (2):
        targeting N bits at the HARQ output port that allows Incremental Redundancy Hybrid Automatic Repeat Request (IR-HARQ) combining with following transmissions that complies again with constraint (1).

4. The method of claim 1, further comprising estimating a root-mean-square (RMS) of the received LLR after a combining according to an effective number of accumulations in a circular HARQ buffer per code rate and per HARQ transmission index.

5. The method of claim 1, further comprising optimizing four parameters to generate a compression configuration for the HARQ compression.

6. The method of claim 1, wherein the block-wise HARQ compression is performed according to local power.

7. The method of claim 1, further comprising performing a second HARQ compression to further reduce the number of HARQ bits to a compressed number of HARQ bits, one of the first HARQ compression and the second HARQ compression comprising a unified HARQ compression and another of the first HARQ compression and the second HARQ compression comprising the block wise HARQ compression.

8. An apparatus for wireless communication, the apparatus comprising:
    a memory; and
    at least one processor coupled to the memory and configured to:
        perform a first HARQ compression to reduce a number of HARQ bits, the HARQ compression comprising a block-wise HARQ compression; and
        save the compressed HARQ bits to a double data rate (DDR) storage,
        wherein the HARQ compression includes an estimate of a power of a received likelihood ratio (LLR).

9. The apparatus of claim 8, wherein the HARQ compression scales from the received LLR and a previous combined HARQ LLR towards a decoder and towards an HARQ output port are determined according to two constraints.

10. The apparatus of claim 9, wherein to the two constraints include:
    constraint (1):
        reaching a desired root-mean-squared (RMS) at an input to the decoder to maximize an error correction performance, and
    constraint (2):
        targeting N bits at the HARQ output port that allows Incremental Redundancy Hybrid Automatic Repeat Request (IR-HARQ) combining with following transmissions that complies again with constraint (1).

11. The apparatus of claim 8, further comprising estimating a root-mean-square (RMS) of the received LLR after a combining according to an effective number of accumulations in a circular HARQ buffer per code rate and per HARQ transmission index.

12. The apparatus of claim 8, further comprising optimizing four parameters to generate a compression configuration for the HARQ compression.

13. The apparatus of claim 8, wherein the block-wise HARQ compression is performed according to local power.

14. The apparatus of claim 8, the at least one processor further configured to perform a second HARQ compression to further reduce the number of HARQ bits to a compressed number of HARQ bits, one of the first HARQ compression and the second HARQ compression comprising a unified HARQ compression and another of the first HARQ compression and the second HARQ compression comprising the block wise HARQ compression.

15. A non-transitory computer-readable medium storing computer executable code for wireless communication, the code when executed by a processor causing the processor to:
- perform a first HARQ compression to reduce a number of HARQ bits, the HARQ compression comprising a block-wise HARQ compression; and
- saving the compressed HARQ bits to a double data rate (DDR) storage, wherein the HARQ compression includes an estimate of a power of a received likelihood ratio (LLR).

16. The non-transitory computer-readable medium of claim 15, wherein the HARQ compression scales from the received LLR and a previous combined HARQ LLR towards a decoder and towards an HARQ output port are determined according to two constraints.

17. The non-transitory computer-readable medium of claim 16, wherein to the two constraints include:
- constraint (1):
  - reaching a desired root-mean-squared (RMS) at an input to the decoder to maximize an error correction performance, and
- constraint (2):
  - targeting N bits at the HARQ output port that allows Incremental Redundancy Hybrid Automatic Repeat Request (IR-HARQ) combining with following transmissions that complies again with constraint (1).

18. The non-transitory computer-readable medium of claim 15, further comprising estimating a root-mean-square (RMS) of the received LLR after a combining according to an effective number of accumulations in a circular HARQ buffer per code rate and per HARQ transmission index.

19. The non-transitory computer-readable medium of claim 15, further comprising optimizing four parameters to generate a compression configuration for the HARQ compression.

20. The non-transitory computer-readable medium of claim 15, the code when executed by the processor further causing the processor to perform a second HARQ compression to further reduce the number of HARQ bits to a compressed number of HARQ bits, one of the first HARQ compression and the second HARQ compression comprising a unified HARQ compression and another of the first HARQ compression and the second HARQ compression comprising the block wise HARQ compression.

\* \* \* \* \*